April 22, 1930.  F. C. HUSH  1,755,444
METER BOX
Filed June 7, 1928
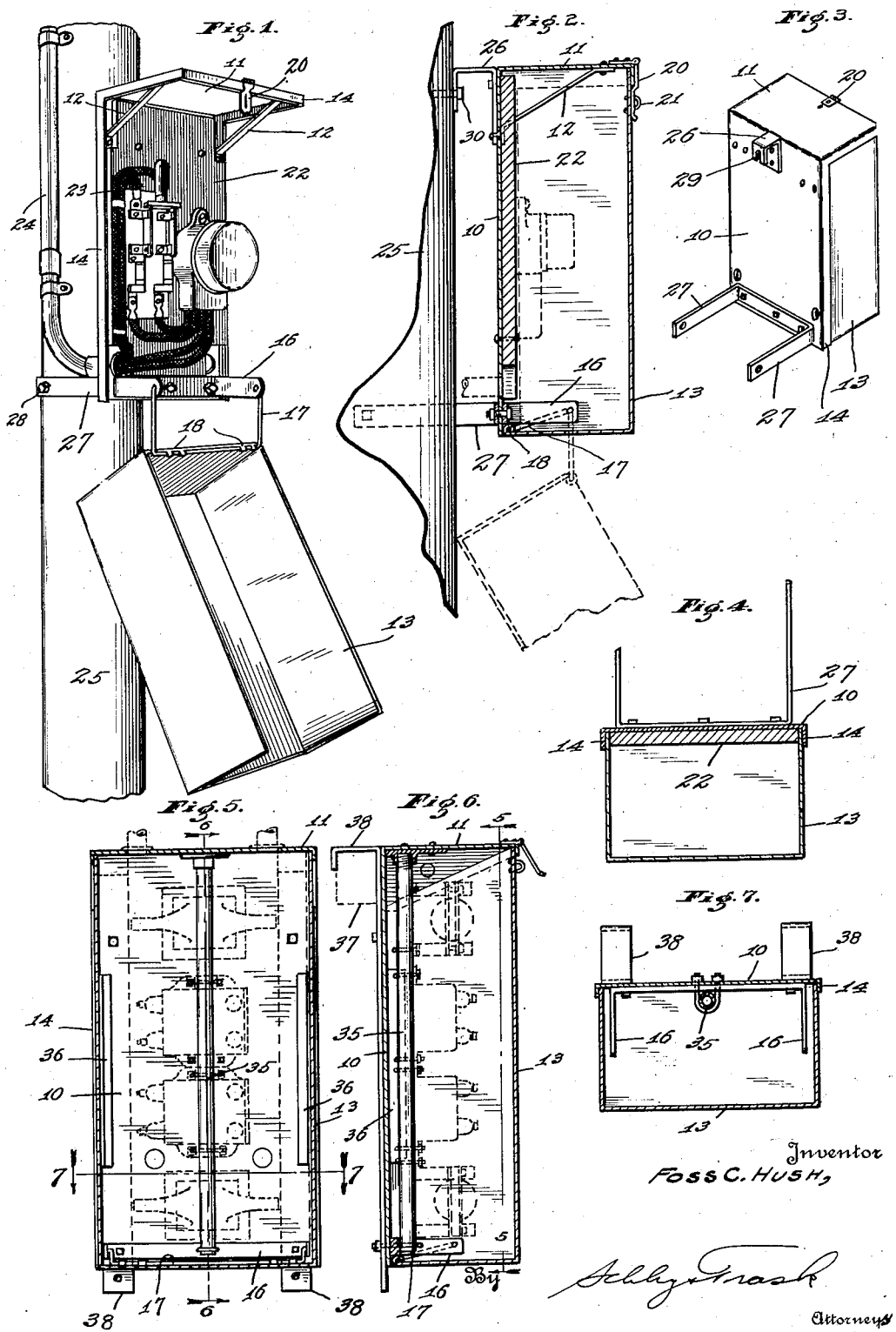
Inventor
Foss C. Hush,
Attorneys Patented Apr. 22, 1930

1,755,444

UNITED STATES PATENT OFFICE

FOSS C. HUSH, OF LINCOLN, NEBRASKA

METER BOX

Application filed June 7, 1928. Serial No. 283,690.

My invention is concerned with providing for the protection of meters, switches, fuses, transformers, and other electrical apparatus mounted out of doors. It is my object to provide a protective box or casing for such apparatus, which box or casing will completely enclose the apparatus and protect it from the elements. More specifically, it is my object to produce a protective box which can be locked when closed and which can be opened to provide ready access to the apparatus or instruments it contains. A further object of my invention is to provide this ready accessibility without increasing the size of the box. A still further object is to construct the box of metal in such a manner as to provide between the metal of the box and the electrical apparatus it contains the clearance which is desirable in view of the fact that the box is usually grounded while circuits within it may have a potential to ground.

In carrying out my invention, I provide a back or base on which the electrical apparatus may be mounted, and rigid with this base I provide a top for the box. The cover forms the remaining sides of the box and is mounted from the base in such a manner that it can be opened and dropped so as not to interfere with access to the instruments or apparatus the box contains.

The accompanying drawing illustrates my invention: Fig. 1 is a perspective view of the box with the cover open; Fig. 2 is a vertical section through the closed box, the open position of the cover being indicated in dotted lines; Fig. 3 is a perspective view showing the brackets provided for mounting the box on a pole; Fig. 4 is a horizontal section through the box; Fig. 5 is a vertical section, parallel to the box-back, through a slightly modified form of box; Fig. 6 is a vertical section on the line 6—6 of Fig. 5; and Fig. 7 is a horizontal section on the line 7—7 of Fig. 5.

The stationary portion of my box comprises a back or base 10 and a top 11. These two sides of the box are conveniently formed integrally from sheet metal, and diagonal braces 12 may be employed to support the outer edge of the top 11. The box cover 13 is also conveniently formed of sheet metal to provide the other four sides of the box. I have found it desirable to provide the back 10 and top 11 of the box with inwardly and downwardly extending flanges 14 adapted to overlie the edges of the cover 13 when such cover is in place. These flanges serve to prevent the entrance of rain, snow, or sleet, and thus form additional protection for the instruments which the box contains.

For the purpose of mounting the cover on the box, I secure near the bottom edge of the back 10 a U-shaped bracket 16 the two parallel legs of which extend forward from the box-back 10. The outer ends of these parallel legs are provided with holes adapted to receive the in-bent ends of the U-shaped link 17 which is pivotally attached to the bottom edge of the cover 13. This attachment is conveniently effected by providing the bottom of the cover with integral fingers 18 which may be bent around the intermediate leg of the link 17.

The length of the parallel legs of the link 17 is made such that the box cover when in closed position will fit tightly against the face of the back 10 as is clear from Fig. 2. With the box cover in this position, the upper edges thereof are received within the flanges 14 projecting downwardly from the edges of the top 11 and the side edges of the cover lie inside of the flanges 14 on the back 10. The top 11 may be provided with a hasp 20 adapted to co-operate with a staple 21 mounted on the cover 13 in order that the cover may be locked in closed position with an ordinary padlock (not shown).

As a support for the instruments contained within the box, I may secure to the inner face of the back 10 a board 22 on which the instruments may be mounted. This board is slightly narrower than the back 10 in order to provide between it and the flanges 14 on the back 10 a space for the reception of the side edges of the cover 13, as is clear from Fig. 4. Wires 23 associated with the instruments mounted on a board 22 pass through an opening in the back 10 and into a conduit 24.

Any desired means for supporting the box may be employed. In Figs. 1, 2, and 3, I have illustrated a convenient means for supporting the box from a pole 25. This means comprises an upper bracket 26 and a lower bracket 27, both of which are secured to the outer face of the box-back 10. The lower bracket is U-shaped, and the parallel legs thereof are adapted to straddle the pole 25 and to be secured thereto as by means of lag screws 28. The upper bracket conveniently has a vertical slot 29 which receives a third lag screw 30 in the pole 25.

The box constructed as described is substantially weather-tight when the cover is closed. When the cover is open, it drops to the position indicated in Fig. 1 and in dotted lines in Fig. 2 where it is out of the way and does not interfere with ready access to the instruments contained in the box. If desired, the cover 13 may be removed entirely merely by springing the ends of the link 17 out of the holes in the bracket 16.

In the modified form of box illustrated in Figs. 5, 6, and 7, the back 10, top 11, cover 13, bracket 16, and link 17 are substantially the same as the correspondingly numbered parts in the box illustrated in Figs. 1 to 4 inclusive. In the box illustrated in Figs. 5, 6, and 7, instead of providing a board on which the instruments in the box may be mounted, I provide a vertically extending rod or pipe 35. Certain electrical instruments of the type commonly mounted in protective boxes out of doors are constructed in such a manner as to be readily mounted on such a rod or pipe. There being no board on the back 10 to form an inner support for the side edges of the cover 13, I may obtain this support by means of small angle-irons 36 which are secured to the back 10 and which are spaced slightly from the side flanges 14 thereof to provide a space for the reception of the side edges of the cover 13.

If it is desired to mount the box on a crossarm 37 on a pole, I may eliminate the brackets 26 and 27 and provide brackets or stirrups 38 which are secured to the box-back 10 and which overlie the cross arm 37 as indicated in Fig. 6.

I claim as my invention:—

1. A box, comprising a back and top rigid with each other, a cover formed to provide when in place a bottom, sides, and a front for the box, a rigid member pivotally mounted near the back edge of the cover bottom, and a bracket secured to the box-back and projecting forwardly therefrom, said member being pivotally mounted in said bracket near the front thereof.

2. A box, comprising a back and top rigid with each other, a cover formed to provide when in place a bottom, sides, and a front for the box, and means for movably supporting said cover, said means including a rigid link member adapted to be enclosed by said cover when it is in closed position.

3. A box, comprising a back and top rigid with each other, a cover formed to provide when in place a bottom, sides, and a front for the box, and means for movably supporting said cover, said means including a rigid link member adapted to be enclosed by said cover when it is in closed position, said box-back and top being provided with flanges which overlie the edges of said cover when it is in closed position.

4. A box, comprising a back and top rigid with each other, a cover formed to provide when in place a bottom, sides, and a front for the box, said bottom, when the cover is in place, extending rearwardly to a point adjacent the box-back, a rigid member pivotally mounted near the back edge of the cover bottom, a bracket secured to the box-back and projecting forwardly therefrom, said member being pivotally mounted in said bracket near the front thereof and adapted to extend from its mounting in the bracket rearwardly toward the box-back when the cover is in place, said box-back and top being provided with flanges which overlie the edges of said cover when it is in closed position, and means for retaining said cover in closed position.

5. A box, comprising a back and top rigid with each other, a cover formed to provide when in place a bottom, sides, and a front for the box, said bottom, when the cover is in place, extending rearwardly to a point adjacent the box-back, a rigid member pivotally mounted near the back edge of the cover, a bracket secured to the box-back and projecting forwardly therefrom, said member being pivotally mounted in said bracket near the front thereof and adapted to extend from its mounting in the bracket rearwardly toward the box-back when the cover is in place, said box-back and top being provided with flanges which overlie the edges of said cover when it is in closed position, and means located near the top of the box for retaining the cover in closed position.

6. A box, comprising a back and top rigid with each other, a cover formed to provide when in place a bottom, sides, and a front for the box, said bottom, when the cover is in place, extending rearwardly to a point adjacent the box-back, a rigid member pivotally mounted near the back edge of the cover bottom, a bracket secured to the box-back and projecting forwardly therefrom, said member being pivotally mounted in said bracket near the front thereof and adapted to extend from its mounting in the bracket rearwardly toward the box-back when the cover is in place, and means for retaining said cover in closed position.

7. A box, comprising a back and top rigid with each other, a cover formed to provide when in place a bottom, sides, and a front for the box, a member pivotally mounted near the back edge of the cover bottom, a bracket secured to the box-back and projecting forwardly therefrom, said member being pivotally mounted in said bracket near the front thereof, a mounting bracket secured to the box-back near its lower edge, and an additional mounting bracket secured near the top of the box-back, said last-named mounting bracket being provided with a rearwardly extending projection, the end of which is bent downward and provided with a hole for the reception of a screw by means of which the box may be attached to a support.

In witness whereof, I have hereunto set my hand at Lincoln, Nebraska, this 4th day of June, A. D. one thousand nine hundred and twenty eight.

FOSS C. HUSH.